US009477257B1

(12) United States Patent
Kulkarni et al.

(10) Patent No.: US 9,477,257 B1
(45) Date of Patent: Oct. 25, 2016

(54) METHODS AND APPARATUS FOR LIMITING A NUMBER OF CURRENT CHANGES WHILE CLOCK GATING TO MANAGE POWER CONSUMPTION OF PROCESSOR MODULES (71) Applicant: Juniper Networks, Inc., Sunnyvale, CA (US)

(72) Inventors: Vaishali Kulkarni, San Jose, CA (US); Jeffrey G. Libby, Cupertino, CA (US); Mihir Wagh, Mountain View, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 674 days.

(21) Appl. No.: 13/799,210

(22) Filed: Mar. 13, 2013

(51) Int. Cl.
*G06F 1/00* (2006.01)
*G06F 1/08* (2006.01)
*G06F 1/26* (2006.01)
*G06F 1/04* (2006.01)
*G06F 1/32* (2006.01)
*G06F 3/06* (2006.01)

(52) U.S. Cl.
CPC . *G06F 1/08* (2013.01); *G06F 1/04* (2013.01); *G06F 1/26* (2013.01); *G06F 1/3225* (2013.01); *G06F 3/0634* (2013.01)

(58) Field of Classification Search
CPC .... G06F 1/3203; G06F 1/3287; G06F 1/324; G06F 1/329; G06F 1/305; G06F 1/3296; G06F 11/0757; G06F 1/3228; G06F 1/3237; G06F 1/08; G06F 1/26; G06F 3/0634; G06F 1/04; G06F 1/3225
See application file for complete search history.

(56) References Cited

U.S. PATENT DOCUMENTS

| 6,470,223 | B1 * | 10/2002 | Naganuma | G05B 19/052 700/23 |
| 7,587,686 | B1 | 9/2009 | Schleicher | |
| 2008/0192548 | A1 * | 8/2008 | Shibata | G11C 11/5628 365/185.17 |
| 2009/0268629 | A1 | 10/2009 | Hisamatsu | |
| 2010/0036998 | A1 * | 2/2010 | Ben-Rubi | G06F 3/0625 711/100 |
| 2011/0185213 | A1 * | 7/2011 | Yoshida et al. | 713/340 |
| 2012/0198256 | A1 * | 8/2012 | Neumann | 713/322 |
| 2012/0221880 | A1 * | 8/2012 | Kim | G06F 1/3225 713/400 |

OTHER PUBLICATIONS

Clabes, Joachim, et al. "Design and Implementation of the POWER5™ Microprocessor." Proceedings of the 41st annual Design Automation Conference. ACM, 2004, pp. 670-672.
Mohamood, Fayez, et al. "Noise-Direct: A Technique for Power Supply Noise Aware Floorplanning Using Microarchitecture Profiling." Proceedings of the 2007 Asia and South Pacific Design Automation Conference. IEEE Computer Society, 2007, 6 pages.

* cited by examiner

*Primary Examiner* — Thomas Lee
*Assistant Examiner* — Zhipeng Wang
(74) *Attorney, Agent, or Firm* — Cooley LLP (57) ABSTRACT

A dispatch module implemented in at least one of a memory or a processing device is operatively coupled to multiple processing modules, each having a first clock configuration and a second clock configuration. The dispatch module, at a first time, changes a first processing module included in the multiple processing modules from a first clock configuration to a second clock configuration. The dispatch module prohibits, at a second time within a predetermined time period and after the first time, a second processing module included in the multiple processing modules from changing from the first clock configuration to the second clock configuration if an indicator associated with a number of changes of the multiple processing modules between a first clock configuration and a second clock configuration within the predetermined time period and prior to the second time satisfies a criterion.

17 Claims, 4 Drawing Sheets

| Database 260 | |
|---|---|
| 265 | 270 |
| 1 | Change Counter Value |
| | Change Criterion |
| 2 | Time Counter Value |
| | Time Criterion |

METHODS AND APPARATUS FOR LIMITING A NUMBER OF CURRENT CHANGES WHILE CLOCK GATING TO MANAGE POWER CONSUMPTION OF PROCESSOR MODULES

BACKGROUND

Some embodiments described herein relate generally to clock gating. More particularly, some embodiments described herein relate to systems and methods for dynamic coarse clock gating packet-processor-engines for power saving in application specific integrated circuits (ASICs) using sliding timing windows to limit current surge.

Clock gating can be used to "turn off", deactivate, or power down parts of a circuit to reduce the power consumption of a device. A clock signal passes through a logic circuit that can selectively block, or gate, the clock signal. When the clock signal is blocked, logic driven by the gated clock signal suspends operation and does not consume any dynamic power (e.g., power consumed by a processor for a clocked flip-flop). The amount of power savings is related to the amount of logic that is effectively turned off. For example, higher gating on the clock tree (i.e., the clock distribution network) can result in turning off a relatively larger portion of the clock network, thereby using a relatively lower amount of power than would otherwise be used. If the clock is gated at the flip-flop level (for example, immediately before the clock input to a register), very little power is saved because nearly the entire clock network still toggles (e.g., turns on and off).

ASICs includes general circuits, such as logic, memory, and input/output ("I/O") ports, and a specialized function circuit to implement a function that the general circuits cannot or does not perform. For instance, the specialized function circuit might implement analog or mixed analog/digital circuitry, whereas the circuits might be limited to only digital circuits. In other cases, the specialized function circuit can implement a Peripheral Component Interconnect Express ("PCIe") physical layer ("PHY"), or any other complex, highly dense circuit.

An ASIC can include a two-dimensional array (fabric) of many relatively small logic elements (referred to herein as power processor elements or PPEs). The basic circuitry of these PPEs is typically the same or substantially the same, and is provided by a subset of the masks that are used to make the ASIC. Accordingly, the masks in this subset can be typically the same or substantially the same. The overall function(s) performed by a PPE can be customized to some extent by customizing one or more additional masks used to make a particular ASIC product (e.g., a structured ASIC). Similarly, connections to, from, and/or between PPEs can be customized by customizing additional masks used to make the product. Because the ASIC typically has the same basic circuitry, the task of designing the ASIC to perform particular tasks is greatly simplified, with increased speed of manufacture, increased reliability, and reduced cost. An entire ASIC does not have to be designed "from scratch." Instead, only the customizable masks are designed.

A possible use of ASIC technology is to produce ASICs that are functionally equivalent to programmed field-programmable gate arrays ("FPGAs"). After a logic design has been adequately "proven" in an FPGA, the design may be "migrated" to an ASIC. In ASICs, the disposition (location or arrangement) of circuit functions (e.g., logic functions) on the ASIC can be quite different from the disposition of those functions on the FPGA to which the ASIC is supposed to be functionally equivalent. Thus, it may not be possible to simply duplicate on the ASIC the architecture of the related FPGA circuitry for routing, gating, or distributing clock signals to the functional circuitry. Accordingly, it is difficult to transport the efficacy of the FPGA clock gating circuitry to the ASIC.

In some instances, a method for clock gating PPEs of an ASIC includes monitoring the rate and trend (e.g., increasing or decreasing) of traffic (i.e., workload) experienced at or on an interface. In such instances, the ASIC can include a clock gating method based on the rate and trend of the traffic experienced by the entire ASIC, thereby saving a measure of power. Because the clock gating is based on the rate of traffic of the entire ASIC, however, in some instances, one or more PPEs can remain powered on even though they are not immediately needed, thereby requiring power. In addition, frequent clock gating of PPEs in close proximity within the ASIC can result in electrical current surges. Such current surges can result in resonance and failure of the ASIC and/or power supplies.

Thus, a need exists for improved systems and methods of dynamic coarse-clock -gating packet-processor-engines for power saving in ASICs while limiting current surges.

SUMMARY

Methods and apparatus for clock gating processing modules in ASICs are described herein. In some embodiments, a dispatch module implemented in at least one of a memory or a processing device is operatively coupled to a set of processing modules each of which has a first clock configuration and a second clock configuration. The dispatch module is configured to change, at a first time, a first processing module included in the set of processing modules from a first clock configuration to a second clock configuration. The dispatch module is configured to prohibit a second processing module included in the set of processing modules from changing from the first clock configuration to the second clock configuration at a second time within a predetermined time period and after the first time if an indicator associated with a number of changes of the set of processing modules between a first clock configuration and a second clock configuration within the predetermined time period and prior to the second time satisfies a criterion.

DETAILED DESCRIPTION

In some embodiments, a dispatch module implemented in at least one of a memory or a processing device is operatively coupled to a set of processing modules each of which having a first clock configuration and a second clock configuration. The dispatch module is configured to change, at a first time, a first processing module included in the set of processing modules from a first clock configuration to a second clock configuration. The dispatch module is configured to prohibit a second processing module included in the set of processing modules from changing from the first clock configuration to the second clock configuration at a second time within a predetermined time period and after the first time if an indicator associated with a number of changes of the set of processing modules between a first clock configuration and a second clock configuration within the predetermined time period and prior to the second time satisfies a criterion.

In some embodiments, a non-transitory processor readable medium storing code representing instructions to be executed by a processor, the code can cause a processor to receive, at a dispatch module prior to a first time, a first data unit to be processed. The code can cause the processor to initiate, at the first time, a clock signal associated with a first processing module from a set of processing modules in response to receiving the first data unit. The code can cause the processor to initiate a counter based on initiating the clock signal associated with the first processing module. The counter is associated with a current change during a predetermined time period immediately following the first time. The code can cause the processor to prohibit, at a second time within the predetermined time period, initiating a clock signal associated with a second processing module included in the set of processing modules based on a value of the counter at the second time satisfying a criterion associated with the current change within the predetermined time period.

In some embodiments, a dispatch module implemented in at least one of a memory or a processing device is operatively coupled to a set of processing modules each of which having a first clock configuration and a second clock configuration. The dispatch module is configured to modify, at a first time, a value of a counter such that the value of the counter at the first time satisfies a current change criterion. The change of the value of the counter is based on the dispatch module changing a first processing module included in the set of processing modules from the first clock configuration to the second clock configuration. The counter is associated with the dispatch module changing a second processing module included in the set of processing modules from the first clock configuration to the second clock configuration at a second time prior to the first time. The counter is further associated with a predetermined time period immediately following the second time period and including the first time period.

As used in this specification, a "data unit" refers to any suitable portion of data. For example, data unit can refer to a data packet, a data cell, or a data frame such as, information that is delivered as a unit among peer entities of a network and that may contain control information, such as address information, or user data.

As used herein, a module can be, for example, any assembly and/or set of operatively-coupled electrical components, and can include, for example, a memory, a processor, electrical traces, optical connectors, software (executing in hardware), and/or the like.

As used herein, the singular forms "a," "an" and "the" include plural referents unless the context clearly dictates otherwise. Thus, for example, the term "module" is intended to mean a single module or a combination of modules.

Figure 1:
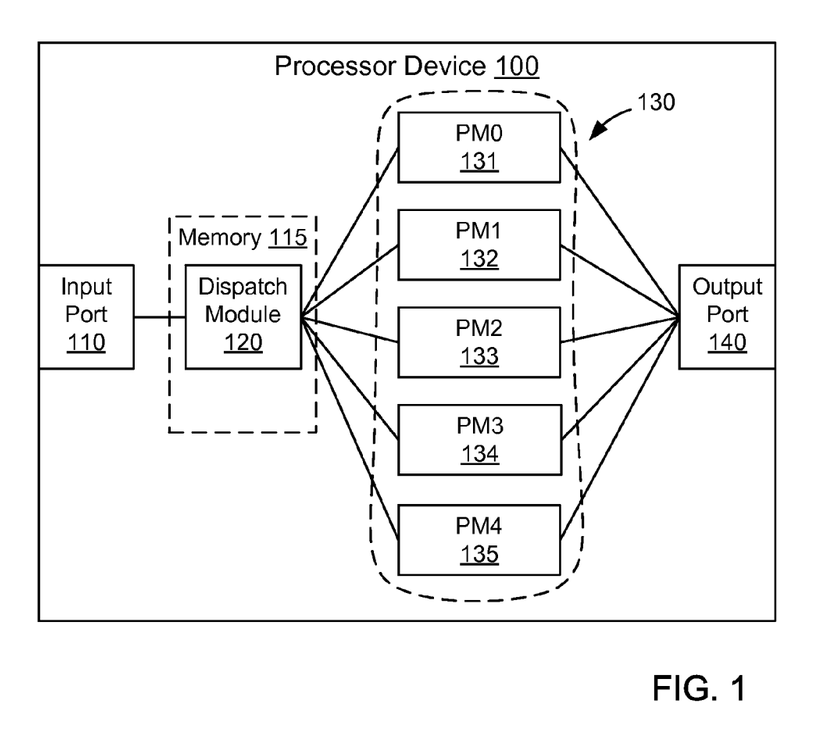
FIG. 1 is a schematic illustration of a processor device according to an embodiment.

FIG. 1 is a schematic illustration of a processing device 100 according to an embodiment. The processing device 100 can be, for example, an application specific integrated circuit (ASIC), a programmable logic device (PLD), a field-programmable gate array (FPGA), or any other suitable processing device and/or chip package. In some embodiments, the processing device 100 can be included in, for example, a core router, an edge router, a switch fabric, and/or any other suitable device. In such embodiments, the processing device 100 can execute a set of instructions associated with, for example, a classification process, a forwarding process, and inspection process (e.g., a deep packet inspection or a shallow packet inspection), and/or the like.

The processing device 100 includes at least an input port 110, a dispatch module 120, a set of processing module 130, and an output port 140. The input port 110 can be any suitable port or connection (e.g., a soldered connection such as a ball grid array (BGA), a socket connection such as a land grid array (LGA), or the like) that enables the processing device 100 to receive a data unit (e.g., a data packet). Similarly, the output port 140 can be any suitable port or connection that enables the processing device 100 to send (e.g., forward) a data unit.

As shown in FIG. 1, the dispatch module 120 can be, for example, a hardware module included in the processing device 100. In some embodiments, the dispatch module 120 can be a software module included in, for example, a memory 115 and executed in the processing device 100. As shown, the dispatch module 120 is operatively coupled to the input port 110 and the processing modules 130. The dispatch module 120 can be configured to execute a set of instructions associated with clock gating one or more processing modules included in the set of processing modules 130. For example, the dispatch module 120 can be configured to change one or more processing modules in the set of processing module 130 from a first clock configuration (e.g., an "off" configuration) to a second clock configuration (e.g., an "on" configuration). The dispatch module 120 can send a clock signal to the one or more processing modules in the set of processing modules 130 for a predetermined time period and can increment or decrement one or more indicators (e.g., a counter) associated with a number of changes (e.g., current changes as a result of changing a processing module from the first clock configuration to the second clock configuration or vice-versa) during the predetermined time period. Moreover, if the indicator satisfies a criterion (e.g., reaches or exceeds a threshold), the dispatch module 120 can prohibit any other processing module included in the set of processing modules 130 from changing from the first clock configuration to the second clock configuration.

In some embodiments, the dispatch module 120 can include multiple indicators associated with multiple overlapping predetermined time periods. For example, a portion of a predetermined time period associated with a first processing module can overlap a portion of a predetermined time period associated with a second processing module. In such embodiments, if the indicator associated with the second predetermined time period has satisfied a criterion, the dispatch module 120 can prevent a third processing module from changing from the first clock configuration to the second clock configuration regardless of the ending of the predetermined time period associated with the first processing module. In this manner, the dispatch module 120 can be configured to clock gate one or more processing modules based on a sliding clock window (e.g., due at least in part on the overlapping of predetermined time periods).

The set of processing modules 130 (also referred to herein as "processing modules" 130) can be, for example, one or more hardware modules included in the processing device 100. For example, in some instances, the processing modules 130 can be power processor engines configured to perform a common function. Expanding further, the processing modules 130 can have any suitable architecture (e.g., transistors, gates, or other active device(s)) that enable the processing modules 130 to perform a process (e.g., execute a process based on a set of instructions) on a data unit using, for example, first-in-first-out (FIFO) methodology. For example, the processing modules 130 can each be configured to perform a classification of a data unit, a forwarding of the data unit, an inspection of the data unit, and/or the like.

As shown in FIG. 1, the set of processing modules 130 includes a first processing module 131, a second processing module 132, a third processing module 133, a fourth processing module 134, and a fifth processing module 135. Although shown as including five processing modules, in other embodiments, the processing device 100 can include more than five processing modules (e.g., six, seven, eight, or more processing modules). In still other embodiments, the processing device 100 can include less than five processing modules (e.g., two, three, or four processing modules).

The processing modules 130 are each configured to change between the first clock configuration and the second clock configuration, as described above. More specifically, one or more processing modules can be in the first clock configuration when a portion of the processing device 100 is clock gated. For example, the dispatch module 120 can clock gate a portion of the clock tree (e.g., the clock distribution network) such that any or all of the processing modules disposed downstream of the portion of the clock tree are clock gated. Thus, electrical current does not substantially flow to the downstream processing modules while in the first clock configuration. Conversely, while in the second clock configuration, electrical current is sent to the downstream processing modules.

In some embodiments, the processing device 100 can be arranged such that each successive processing module is associated with a lower priority value than a priority value of the previous module. For example, the set of processing modules 130 is such that the first processing module 131 is associated with a first priority value (e.g., a highest priority value). The second processing module 132 is associated with a second priority value that is lower the first priority value. The third processing module 133 is associated with a third priority value that is less than the second priority value. The fourth processing module 134 is associated with a fourth priority value that is less than the third priority value. The fifth processing module 135 is associated with a fifth priority value that is less than the fourth priority value (i.e., a lowest priority level). In this manner, the dispatch module 120 can send a data unit to a processing module having the highest priority. In such embodiments, the dispatch module 120 can associate, for example, a workload load indicator with each of the processing modules. In this manner, the dispatch module 120 can send a data packet to a processing module with the highest priority having a workload indicator below a threshold value. In other embodiments, the processing modules 130 can each have the same priority value.

Figure 2:
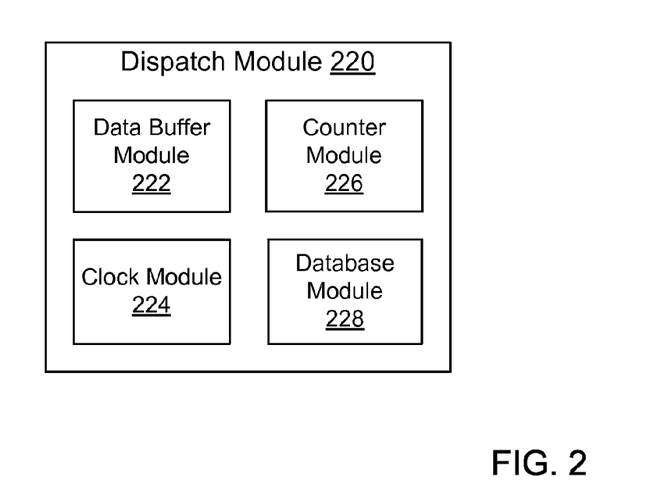
FIG. 2 is a schematic illustration of a dispatch module according to an embodiment.

FIG. 2 is a schematic illustration of a dispatch module 220 according to an embodiment. In some instances, the dispatch module 220 can be included in, for example, the processing device 100 (e.g., the dispatch module 220 can be similar to or the same as the dispatch module 120). The dispatch module 220 can be configured to execute a set of instructions associated with clock gating one or more processing modules included in a processing device. More specifically, the dispatch module 220 can include a data buffer module 222, a clock module 224, a counter module 226, and a database module 228.

The data buffer module 222 can be configured to buffer and/or at least temporarily store a set of data packets. For example, in some instances, the data buffer module 222 can be configured to store a set of data packets, received at an input port (e.g., the input port 110 shown in FIG. 1), such that the dispatch module 220 can send one or more data packets from the data buffer module 222 to a processing module. More specifically, the buffer module 222 can send a data packet to a processing module when the processing module is in the second clock configuration. In some embodiments, where more than one processing module is in the second clock configuration during a predetermined time period, the buffer module 222 can send a data packet to a processing module with the highest priority and having a workload indicator below a threshold value. In other embodiments, the data buffer module 222 can evenly distribute data packets between more than one processing modules in the second clock configuration during the predetermined time period. In some instances, a workload indicator associated each processing module in the second clock configuration during the predetermined time period can satisfy a workload criterion (e.g., at or exceeding a workload threshold). In such instances, the buffer module 222 can buffer (e.g., at least temporarily store) one or more data packets until a workload indicator associated with at least one of the processing modules no longer satisfies the workload criterion.

The clock module 224 can include, or can be operably coupled to, a clock generator such as, for example, a crystal oscillator or the like to generate or transmit a clock signal with a desired frequency. For example, in some instances, the clock signal can be in the form of a square wave having a substantially constant frequency. Thus, the clock module 224 can generate or transmit a clock signal configured to synchronize at least a portion of a processing device (e.g., the processing device 100). Moreover, the clock module 224 can send to a processing module a clock signal that is operative in changing the processing module from the first clock configuration (e.g., the "off" configuration) to the second clock configuration (the "on" configuration). Similarly stated, clock module 224 can clock gate a processing module such that the processing module is in the first clock configuration and can send a clock signal to the processing module to change the processing module from the first clock configuration to the second clock configuration.

The clock signal generated or transmitted by the clock module 224 can be used to define a predetermined time period. For example, the clock module 224 (and more specifically, the oscillator) can provide a clock signal with a given frequency to establish a definition of time relative to a processing device. For example, an electrical current can be transmitted to an oscillator included in or operably coupled to a clock module such that the oscillator oscillates a predetermined number of times per second (e.g., the frequency). In this manner, the number of times the oscillator oscillates can be used to define a length of time relative to a processing device. Thus, the clock module 224 can be used to define the predetermined time period, as described in further detail herein.

The counter module 226 can be configured to increment or decrement one or more counters associated with a set of processing modules (e.g., the set of processing modules 130 described above with reference to FIG. 1). For example, in some instances the counter module 226 can be configured to increment or decrement a change counter associated with the number of current changes (e.g., the number of times one or more processing modules are changed from the first clock configuration to the second clock configuration) during a predetermined time period. For example, the counter module 226 can increment the change counter when a processing module is changed from the first clock configuration to the second configuration and the counter module 226 can decrement the change counter when a processing module is changed from the second clock configuration to the first clock configuration. Moreover, the counter module 226 can define a change criterion such that when the change criterion is satisfied (e.g., a maximum number of current changes within a predefined time period), the dispatch module 220 can prohibit any other processing module from changing between the first configuration and the second configuration.

The counter module 226 can also be configured to increment or decrement a time counter associated with a number of clock cycles sent by the clock module 224. For example, in some instances, the counter module 226 can be configured to increment or decrement the time counter for each oscillation of the clock signal generated or transmitted by the clock module 224. In this manner, the counter module 226 can be configured to count a predetermined number of oscillations of the clock signal to define the predetermined time period. For example, in some instances, the predetermined time period can be 100 nanoseconds. In other instances, the predetermined time period can be controlled (e.g., via a basic input output system (BIOS), a software application, or the like). In this manner, the clock module 224 can send a clock signal to a processing module to change the processing module from the first clock configuration to the second clock configuration and immediately after the processing module is changed to the second clock configuration the counter module 226 can count a predetermined number of clock cycles (e.g., oscillations of the signal wave) to define the predetermined time period.

In some embodiments, the counter module 226 can be configured to increment multiple counters associated with multiple different predetermined time periods. For example, in some embodiments, the changing of a first processing module from the first configuration to the second configuration can be associated with a first counter and a first predetermined time period that overlaps a second predetermined time period having a second counter and being associated with a second processing module. This principle can be expanded to include any number of processing modules associated with any number of predetermined time periods and counters. In such embodiments, multiple (e.g., more than two) predetermined time periods can be overlapping. In this manner, the counter module 226 can include the associated counters that indicate the various current change events during any of the predetermined time periods. In this manner, the dispatch module 220 can define a sliding clock window that can dynamically clock gate any or all of the processing modules based on any of the counters included in the counter module 226.

The database module 228 can be configured to query and/or update a database (e.g., a table or the like, as described below in reference to FIG. 3) and further configured to send a signal to the clock module 224 when a counter criterion has been satisfied. For example, in some instances, the database module 228 can send a signal to the clock module 224 associated with the change counter value satisfying a change counter criterion (e.g., the number of current changes is at or exceeds a change counter threshold) during a predetermined time period. Thus, the clock module 224 can prohibit any other processing module from changing between the first clock configuration and the second clock configuration. Similarly stated, the clock module 224 can clock gate any other processing module during the predetermined time period based at least in part on a signal from the database module 228 associated with the change counter criterion being satisfied.

In some embodiments, the database module 228 can include the database (e.g., a hardware module containing at least a memory). In other embodiments, the database module 228 can be operably coupled to the database. In some embodiments, the database can be operatively accessed by a software module or application that can receive information from a user input and/or display information for visualization by a user. For example, in some embodiments, the database can be included in or operatively accessed by a BIOS and/or any other suitable software application.

Figure 3:
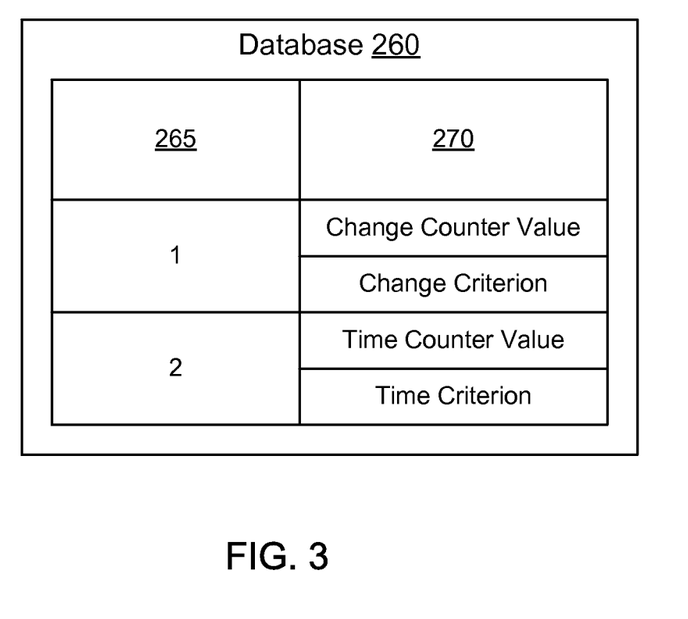
FIG. 3 is a schematic illustration of a portion of a database at a first time, according to an embodiment.

As shown in FIG. 3, the database module 228 can be operably coupled to a database 260. The database 260 can be any suitable database or table configured to store information associated with a set of processing modules (e.g., the processing module 130 shown in FIG. 1). For example, as shown in FIG. 3, the database 260 includes a first column 265 configured to store an indication associated with the change counter (e.g., as indicated by "1" in FIG. 3) and the time counter (e.g., as indicated by "2" in FIG. 3), and a second column 270 configured to store information associated with the change counter and the time counter, respectively.

The second column 270 can store, for example, a counter value and a counter criterion value associated with the change counter "1" and a counter value and a counter criterion value associated with the time counter "2". For example, the second column 270 can store an indication associated with the "change counter value" of the change counter "1" at a first time. In use, the database module 228 can increment or decrement the "change counter value" associated with the change counter "1" based on the number of electrical current changes during the predetermined time period. Similarly stated, the database module 228 can increment or decrement the "change counter value" associated with the change counter "1" based on the number of times a given processing module changes from the first clock configuration to the second clock configuration or when the given processing module changes from the second clock configuration to the first clock configuration, respectively. Therefore, when the "change counter value" equals or exceeds the "change criterion", the database 228 can send a signal to the clock module 224 associated with the change counter "1" satisfying a change criterion. Similarly, the database module 228 can increment or decrement the "counter value" associated with the time counter "2" based on a count of a number of clock cycles during the predetermined time period. Therefore, when the "time counter value" equals or exceeds the "time criterion", the database 228 can send a signal to the clock module 224 associated with the end of the predetermined time period.

Figure 4:
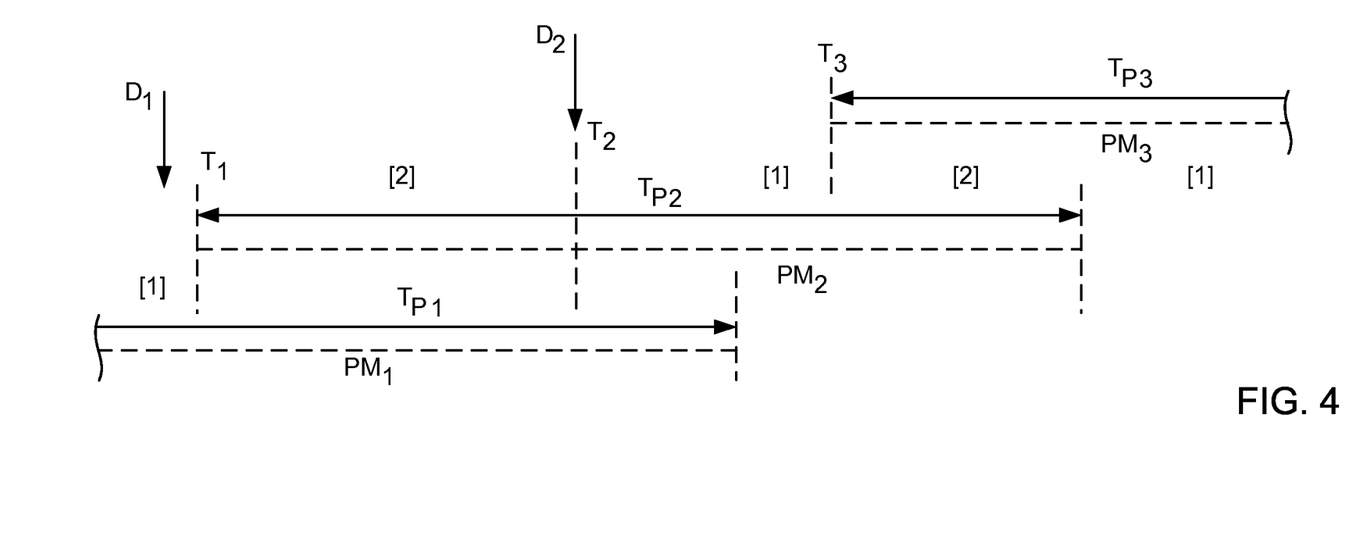
FIG. 4 is a timeline illustration showing a method of clock gating, according to an embodiment.

FIG. 4 is a timeline illustrating, for example, a method of clock gating. The timeline illustrates a progression through time form left to right with events being shown as vertical arrows, time instances shown as vertical lines, time periods shown as arrow-ended horizontal lines; bracketed numbers represent a counter value at an associated time. In use, the dispatch module 220 can send a clock signal to a first processing module $PM_1$ for a first predetermined time period $T_{P1}$ such that the first processing module $PM_1$ is in a second clock configuration to process a data packet during the first predetermined time period $T_{P1}$. In some instances, the data buffer module 222 can receive a data packet $D_1$ from an input port (e.g., the input port 110 described with reference to FIG. 1) and can, in turn, send a signal at time $T_1$ to the clock module 224 to initiate a clock signal at a second processing module $PM_2$. In this manner, the clock signal can change the second processing module $PM_2$ from the first clock configuration (e.g., a clock gated configuration) to the second clock configuration (e.g., an on configuration). Immediately after the second processing module $PM_2$ is changed from the first clock configuration to the second clock configuration, the counter module 226 can increment a second time counter associated with the second processing module $PM_2$ for every clock cycle up to a predetermined number. Thus, the counter module 226 starts the time counter to define a second predetermined time period $T_{P2}$ associated with the second processing module $PM_2$. As shown, the first predetermined time period $T_{P1}$ associated with the first processing module $PM_1$ and the second predetermined time period $T_{P2}$ associated with the second processing module $PM_2$ overlap. Thus, an electrical current change occurs during the first predetermined time period $T_{P1}$ (i.e., the second processing module $PM_2$ is changed from the first clock configuration to the second clock configuration). In this manner, the counter module 226 can increment the change counter from one to two (e.g., as represented by the change from [1] to [2] in FIG. 4). The counter module 226 can send a signal to the database module 228 associated with the change counter and the second time counter such that the database module 228 updates the database (e.g., the database 260).

In some instances, the change counter criterion of the dispatch module 220 can be two [2]. In this manner, the dispatch module 220 can be configured to prohibit (e.g., block, suspend, clock gate, or otherwise prevent) any other processing module from changing from the first clock configuration to the second clock configuration during the first predetermined time period $T_{P1}$. For example, in some instances, the data buffer module 222 can receive a second data packet $D_2$ at a second time $T_2$ and can send a signal to the database module 228 associated with a request to forward the second data packet $D_2$ to a third processing module $PM_3$. The database module 228 can query the database to determine that the change counter criterion is satisfied within the first predetermined time period $T_{P1}$, and can send a signal to the data buffer module 222 such that the data buffer module 222 buffers (e.g., temporarily stores) the second data packet at the second time $T_2$.

The counter module 226 can increment the time counter associated with the first processing module $PM_1$ such that the time counter satisfies the time counter criterion (e.g., reaches or exceeds the time counter criterion value). In this manner, the counter module 226 can send a signal to the database module 228 associated with the time counter and the database module 228 can, in turn, send a signal to the clock module 224 associated with the time counter criterion being satisfied. Upon receiving the signal from the database module 228, the clock module 224 can terminate (e.g., end, suspend, block, clock gate, or otherwise stop) the clock signal sent to the first processing module $PM_1$ such that the first processing module $PM_1$ changes from the second clock configuration to the first clock configuration. As shown in FIG. 4, the predetermined time period $T_{P1}$ ends when the first processing module $PM_1$ is changed from the second clock configuration to the first clock configuration. Immediately after the predetermined time period $T_{P1}$, the counter module 226 can decrement the change counter from two to one (e.g., as represented by the change [2] to [1] in FIG. 4) and the counter module 226 can send a signal to the database module 228 such that the database module 228 updates the database.

After the database module 228 updates the database, the database module 228 can send a signal to the data buffer module 222 associated with the change counter not satisfying the change counter criterion. The data buffer module 222 can, in turn, send a signal to the clock module 224 to initiate a clock signal at a third processing module $PM_3$. In this manner, the clock signal can change the third processing module $PM_3$ from the first clock configuration to the second clock configuration and the second data packet $D_2$ can be sent to the third processing module $PM_3$. Immediately after the third processing module $PM_3$ is changed from the first clock configuration to the second clock configuration, the counter module 226 can increment a third time counter associated with the third processing module $PM_3$ for every clock cycle up to a predetermined number. Thus, the counter module 226 starts the third time counter to define a third predetermined time period $T_{P3}$ associated with the third processing module $PM_3$. As shown, the second predetermined time period $T_{P2}$ associated with the second processing module $PM_2$ and the third predetermined time period $T_{P3}$ associated with the third processing module $PM_3$ overlap. Thus, an electrical current change (i.e., the change of the third processing module from the first clock configuration to the second clock configuration) occurs during the second predetermined time period $T_{P2}$ (and after the first predetermined time period $T_{P1}$). In this manner, the counter module 226 can increment the change counter from one to two (e.g., as represented by the change from [1] to [2] in FIG. 4). The counter module 226 can send a signal to the database module 228 associated with the change counter and the third time counter such that the database module 228 updates the database.

In this manner, current surges at a processing device (e.g., the processing device 100 described with reference to FIG. 1) and/or a power supply as a result of one or more processing modules changing from the first clock configuration to the second clock configuration can be reduced by prohibiting a processing module from changing from the first clock configuration to the second clock configuration during the first predetermined time period $T_{P1}$, the second predetermined time period $T_{P2}$, and/or the third predetermined time period $T_{P3}$ when the change counter satisfies the change counter criterion.

In some instances, the first processing module $PM_1$ can complete a processing of any or all of the data units associated with the first processing module $PM_1$ prior to the end of the predetermined time period $T_{P1}$ and after the first time $T_1$. In such instances, the first processing module $PM_1$ can be prohibited from changing from the second clock configuration to the first clock configuration until the end of the first predetermined time period $T_{P1}$. Expanding further, the changing of the second processing module $PM_2$ from the first clock configuration to the second clock configuration satisfies the change counter criterion such that any other current changes are prohibited during the first predetermined time period $T_{P1}$. Thus, the first processing module $PM_1$ and the second processing module $PM_2$ are prevented from changing from the second clock configuration to the first clock configuration regardless of completing the processing of the data unit(s) until the end of the first predetermined time period $T_{P1}$ is reached or passed.

Although shown in FIG. 4 as sending a clock signal to the third processing module $PM_3$ at the third time $T_3$, in some instances, the clock module 224 can send a clock signal to the first processing module $PM_1$ at the third time $T_3$. For example, in some embodiments, the dispatch module 220 can be configured to send a data packet to a processing module having a highest priority level while not satisfying a workload criterion associated therewith. Therefore, in such instances, the first processing module $PM_1$ can have a priority value that is higher than a priority value of the third processing module $PM_3$. In this manner, when the first processing module $PM_1$ is changed from the second clock configuration to the first clock configuration, the workload criterion associated with the first processor is no longer satisfied. Thus, when the change counter is decremented, the clock module 224 can send a signal to the first processing module $PM_1$ to change the first processing module $PM_1$ from the first clock configuration to the second clock configuration based at least in part on the first processing module $PM_1$ having a highest priority value.

Although the time counter is described above as being incremented to a predetermined number of clock cycles to define the predetermined time period, in other embodiments, the time counter can decrement from the predetermined number such that when the time counter reaches zero, the predetermined time period is reached.

Although the dispatch module 220 is described with reference to FIGS. 2-4 as having a change criterion of 2, in other embodiments, the change criterion can be any suitable number. For example, in some embodiments, a change criterion can be two, three, four, five, 10, 50, 100, 1000, or any other suitable number during a predetermined time period. In such embodiments, the current surges associated with the number of current changes during the time period can be below a threshold such that the processing device and/or the power supply do not experience resonance and/or failure.

Although the dispatch module 220 is described with reference to FIGS. 2-4 as limiting current surges (i.e., the changing of a processing module from the first clock configuration to the second clock configuration) during a predetermined time period, in some instances, the dispatch module 220 can also limit current drops during the predetermined time period. For example, in some embodiments, a dispatch module 220 can include a second counter associated with the number of times a processing module changes from the second clock configuration to the first clock configuration during a predetermined time period. Therefore, if a change criterion value associated with the number of current drops is satisfied during the predetermined time period, the dispatch module 220 can prohibit (e.g., suspend, block, prevent, etc.) one or more processing modules from changing from the second clock configuration to the third clock configuration.

In some embodiments, the dispatch module 220 can include a counter associated with the total number of current changes (e.g., current surges and current drops) during a predetermined time period. In such embodiments, the dispatch module 220 can include or define a change criterion value that is also associated with the total number of current changes. Thus, if the change criterion value that is associated with the total number of current changes is satisfied during the predetermined time period, the dispatch module 220 can prohibit (e.g., suspend, block, prevent, clock gate, etc.) any additional processing modules from changing from the first clock configuration to the second clock configuration or vice versa during the predetermined time period, regardless of the number of processing modules that are in the second clock configuration.

Figure 5:
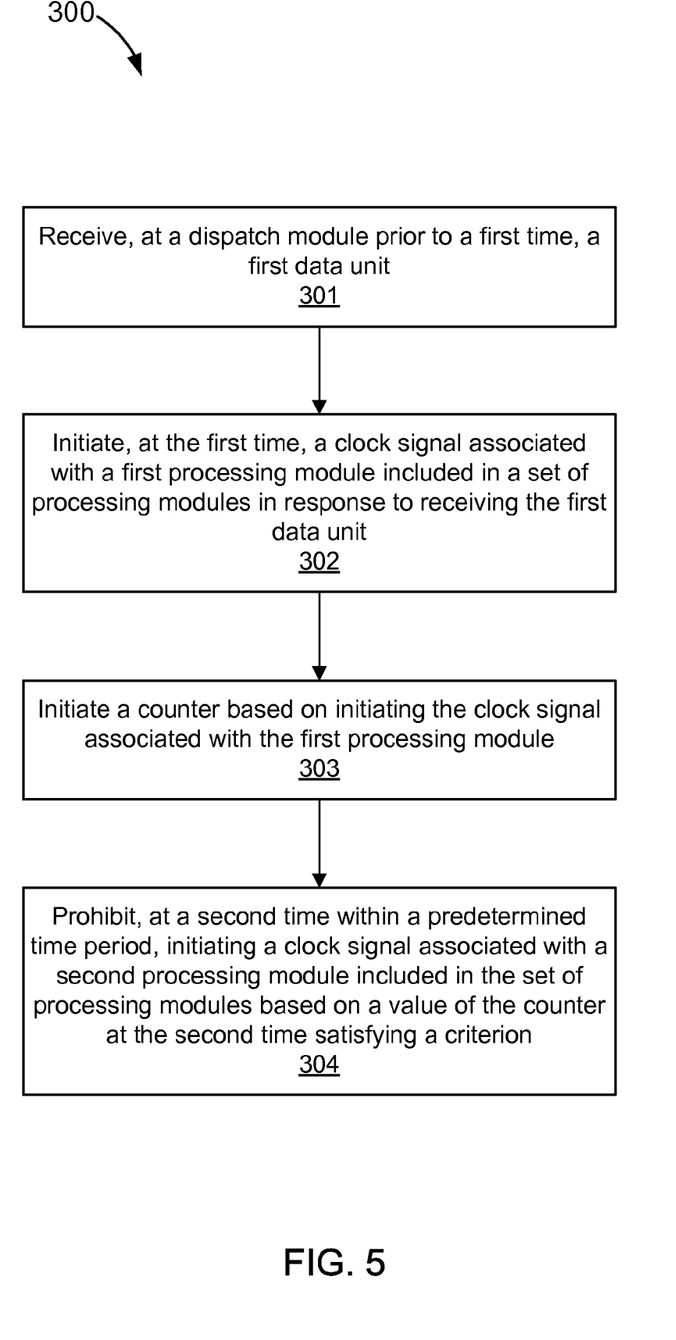
FIG. 5 is a flow chart illustrating a method of clock gating, according to an embodiment.

FIG. 5 is a flowchart illustrating a method of clock gating one or more processing modules, according to an embodiment. A method 300 includes receiving, at a dispatch module prior to a first time, a first data unit, at 301. The dispatch module can be included in a processing device such as, for example, an application-specific integrated circuit (ASIC). In some embodiments, the first data unit can be received at, for example, a data buffer module such as the data buffer module 222 described above with reference to FIGS. 2 and 4.

At 302, a clock signal associated with a first processing module included in a set of processing modules is initiated at a first time in response to receiving the first data unit. For example, in some embodiments, the dispatch module can include a clock module such as the clock module 224 described above with reference to FIGS. 2 and 4 that is configured to send a clock signal to the first processing module to change the first processing module from a first clock configuration (e.g., an off configuration) to a second clock configuration (e.g., on an configuration). The first processing module can be, for example, the first processing module 131 included in the set of processing modules 130 described above with reference to FIG. 1.

At 303, a counter based on initiating the clock signal associated with the first processing module is initiated. In some embodiments, the dispatch module can include a counter module configured to initiate the counter. In this manner, the counter module can increment or decrement a counter based on a number of current changes during a predetermined time period. At a second time during the predetermined time period, the dispatch module can prohibit initiating a clock signal associated with a second processing module included in the set of processing module based on a value of the counter at the second time satisfying a criterion, at 304. For example, in some instances, the counter can satisfy a criterion such as a maximum number of current changes during the predetermined time period. Therefore, with the criterion satisfied, the dispatch module can be configured to buffer a received data unit until the criterion is no longer satisfied. Similarly stated, the dispatch module can prohibit a second processing module from changing from the first clock configuration to the second clock configuration when the criterion is satisfied regardless of receiving a data unit. Thus, the number of current changes during a predetermined time period can be controlled to minimize current surges within the processing device as a result of one or more processing modules changing between the first clock configuration and the second clock configuration.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals (e.g., propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.), or other programming languages and/or other development tools. Additional examples of computer code include, but are not limited to, control signals, encrypted code, and compressed code.

While various embodiments have been described above, it should be understood that they have been presented by way of example only, and not limitation, and as such, various changes in form and/or detail may be made. Any portion of the apparatus and/or methods described herein may be combined in any suitable combination, unless explicitly expressed otherwise. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially.

What is claimed:

1. An apparatus, comprising:
a dispatch module implemented in at least one of a memory or a processing device, the dispatch module configured to be operatively coupled to a plurality of processing modules each having a first clock configuration and a second clock configuration,
the dispatch module configured to change, at a first time during a predetermined time period, a processing module from the plurality of processing modules from the first clock configuration to the second clock configuration,
the dispatch module configured to prohibit a change in clock configuration of each processing module from the plurality of processing modules from the first clock configuration to the second clock configuration at a second time after the first time and within the predetermined time period if an indicator associated with a number of clock configuration changes between a first clock configuration and a second clock configuration within the predetermined time period satisfies a criterion, the criterion being based on a threshold number of times an electric current changes, within the predetermined time period, for at least one of a chip package associated with the dispatch module or a power supply associated with the dispatch module.

2. The apparatus of claim 1, wherein the dispatch module is configured to change the processing module from the first clock configuration to the second clock configuration based on a workload associated with the plurality of processing modules.

3. The apparatus of claim 1, wherein the dispatch module is configured to send a clock signal to the processing module from the plurality of processing modules when the processing module is in the second clock configuration, the dispatch module is configured to gate a clock signal of the processing module from the plurality of processing modules when the processing module is in the first clock configuration.

4. The apparatus of claim 1, wherein the processing module from the plurality of processing modules is a first processing module from the plurality of processing modules,
the dispatch module is configured to modify the indicator in a first manner (1) when the dispatch module changes a second processing module from the plurality of processing modules from its first clock configuration to its second clock configuration during the predetermined time period and (2) if the indicator does not satisfy the criterion,
the dispatch module configured to modify the indicator in a second manner different from the first manner (1) when the dispatch module changes the second processing module from its second clock configuration to its first clock configuration during the predetermined time period and (2) if the indicator does not satisfy the criterion.

5. The apparatus of claim 1, wherein the processing module from the plurality of processing modules is a first processing module from the plurality of processing modules, the predetermined time period is a first predetermined time period associated with the dispatch module changing the first processing module from the first clock configuration to the second clock configuration,
the dispatch module configured to define a second predetermined time period in response to changing a second processing module from the plurality of processing modules from the first clock configuration to the second clock configuration, the second predetermined time period at least partially overlapping the first predetermined time period.

6. The apparatus of claim 1, wherein the dispatch module is configured to be included in an application specific integrated circuit (ASIC) including the plurality of processing modules.

7. The apparatus of claim 1, wherein the processing module from the plurality of processing modules is a first processing module from the plurality of processing modules,
the dispatch module is configured to change a second processing module from the first clock configuration to the second clock configuration at a third time after the predetermined time period if the indicator satisfies the criterion at the second time.

8. The apparatus of claim 1, wherein the indicator is associated with a number of electric current changes caused by changing at least one processing module from the plurality of processing modules between the first clock configuration and the second clock configuration within the predetermined time period.

9. A non-transitory processor-readable medium storing code representing instructions to be executed by a processor, the code comprising code to cause the processor to:
receive, at a dispatch module prior to a first time, a first data unit to be processed;
initiate, at the first time, a clock signal associated with a first processing module from a plurality of processing modules in response to receiving the first data unit at the dispatch module;
initiate a counter based on initiating the clock signal associated with the first processing module, the counter being associated with a number of times an electric current changes during a predetermined time period immediately following the first time; and prohibit, at a second time after the first time and within the predetermined time period, initiating a clock signal associated with a second processing module from the plurality of processing modules based on a value of the counter at the second time satisfying a criterion associated with a threshold number of times the electric current changes within the predetermined time period for at least one of a chip package associated with the dispatch module or a power supply associated with the dispatch module.

10. The non-transitory processor-readable medium of claim 9, further comprising code to cause the processor to:
receive, at the dispatch module after the first time and prior to the second time, a second data unit to be processed, the code to cause the processor to prohibit including code to cause the processor to prohibit initiating the clock signal associated with the second processing module in response to receiving the second data unit.

11. The non-transitory processor-readable medium of claim 9, further comprising code to cause the processor to:
send the first data unit to the first processing module in response to initiating the clock signal to the first processing module.

12. The non-transitory processor-readable medium of claim 9, wherein the code to cause the processor to initiate the clock signal associated with the first processing module includes code to cause the processor to initiate the clock signal associated with the first processing module based at least in part on a workload associated with the plurality of processing modules.

13. The non-transitory processor-readable medium of claim 9, wherein the dispatch module is configured to be included in an application specific integrated circuit (ASIC) including the plurality of processing modules.

14. The non-transitory processor-readable medium of claim 9, further comprising code to cause the processor to:
initiate, after the predetermined time period, the clock signal associated with the second processing module.

15. The non-transitory processor-readable medium of claim 9, further comprising code to cause the processor to:
suspend, at a third time within the predetermined time period and prior to the second time, a clock signal associated with a third processing module from the plurality of processing modules;
modify the value of the counter based on suspending the clock signal associated with the third processing module at the third time;

such that the value of the counter immediately following the third time satisfies the criterion associated with the threshold number of electric current changes within the predetermined time period.

16. An apparatus, comprising:
a dispatch module implemented in at least one of a memory or a processing device, the dispatch module configured to be operatively coupled to a plurality of processing modules each having a first clock configuration and a second clock configuration,
the dispatch module configured to modify, at a first time, a value of a counter that the value of the counter at the first time satisfies a criterion associated with a threshold number of clock configuration changes during a predetermined time period, the value of the counter at the first time indicative of the dispatch module changing a first processing module from the plurality of processing modules from the first clock configuration to the second clock configuration at the first time and a second processing module from the plurality of processing modules from the first clock configuration to the second clock configuration at a second time prior to the first time, the predetermined time period immediately following the second time and including the first time,
the dispatch module configured to prohibit changing any processing module from the plurality of processing modules between the first clock configuration and the second clock configuration while the counter satisfies the criterion, the threshold number of clock configuration changes being based on a threshold number of times an electric current changes, within the predetermined time period, for at least one of a chip package associated with the dispatch module or a power supply associated with the dispatch module.

17. The apparatus of claim 16, wherein the dispatch module is configured to change a third processing module from the plurality of processing modules from the first clock configuration to the second clock configuration at a third time prior to the first time and within the predetermined time period in response to changing a fourth processing module from the plurality of processing modules from the second clock configuration to the first clock configuration at a fourth time immediately before the third time, the dispatch module modifying the value of the counter at the third time in response to the change in clock configuration of the third processing module such that the value of the counter at the third time does not satisfy the criterion.

* * * * *